(No Model.)  2 Sheets—Sheet 1.

O. GLISMANN.
CARRIAGE.

No. 394,263. Patented Dec. 11, 1888.

Witnesses:
Joseph W. Roe.
John G. Pilditch.

Inventor,
Otto Glismann.
by attorneys
Brown & Hall.

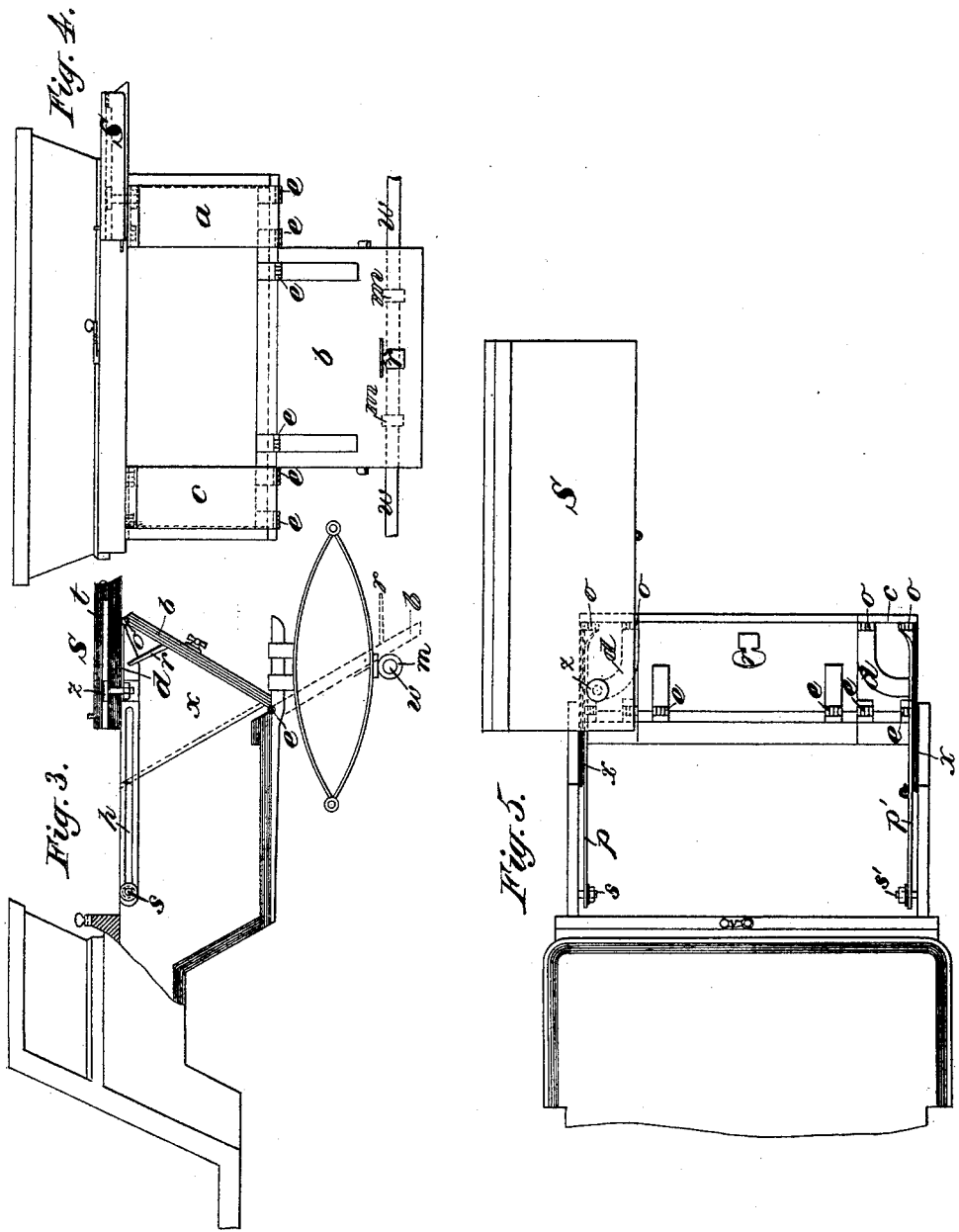

UNITED STATES PATENT OFFICE.

OTTO GLISMANN, OF HAMBURG, GERMANY.

CARRIAGE.

SPECIFICATION forming part of Letters Patent No. 394,263, dated December 11, 1888.

Application filed July 24, 1888. Serial No. 280,366. (No model.)

*To all whom it may concern:*

Be it known that I, OTTO GLISMANN, manufacturer, of Grasskeller 21, Hamburg, in the Empire of Germany, have invented a new and useful Improvement in Carriages, of which the following is a specification, reference being had to the accompanying drawings.

This invention relates to carriages generally known as "Stanhopes," and also to other carriages having a rear seat on which persons may sit toward or facing the direction of travel of the carriage.

One part of the invention consists in the novel construction and combination hereinafter described and claimed, whereby the rear seat may be folded and slid or moved toward the front seat of the carriage, so that it may be set out for use or drawn in when not desired for use.

Another part of the invention consists in pivoting such seat and hinging a part of the back of the carriage-body, as hereinafter described and claimed, so that they may be folded back or opened to permit easy entrance into or exit from the carriage for such person or persons who are to occupy the said seats.

Figure 1:
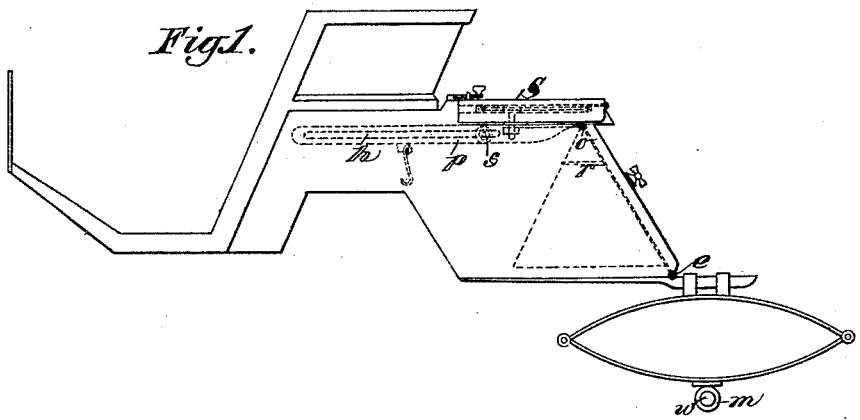
Figure 2:
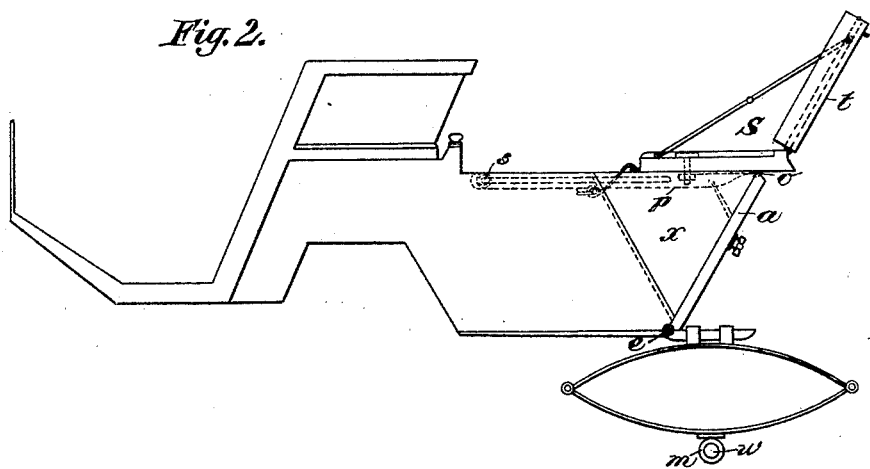

Figure 1 represents an exterior side view of the body of a Stanhope embodying the whole of my invention, and represents it in its closed condition with the rear seat not in use. Fig. 2 is a similar view showing the parts open with rear seat in position for use. Fig. 3 is a side view corresponding with Fig. 2, but showing the principal parts in section. Fig. 4 is a rear view with seat folded back and part of the rear of the body folded down for entrance into the rear part of the vehicle. Fig. 5 is a plan view corresponding with Fig. 4.

Similar letters of reference designate corresponding parts in all the figures.

The side walls of the body of the carriage are shaped, as shown, with a downward and rearward slant at their rear ends, and the rear wall is divided into three parts, all hinged at their lower edges to the floor and capable of folding about their hinges. The two outer parts, $a$ and $c$, are pivoted at their upper ends to rods or bars $p\ p'$, respectively, having longitudinal slots $h$, through which pass bolts $s\ s'$, fixed in the sides of the carriage-body. The said bars limit the travel of the parts $a$ and $c$ about their hinges, and hold them in position when in use by the bolts $s\ s'$ arriving in the ends of the slots and supporting the bars. The central portion, $b$, of the back is connected to the outer portions by suitable fastenings—for instance, by slam-bolts—as shown in Fig. 4, so that it may generally move with the back as a whole, or may be at any time opened by unfastening said bolts and folded down, as shown in Fig. 4. The outer face of the part $b$ may then be supported in any suitable manner, as by rubber collars $m$ on the axle $w$.

The seat S is carried upon the bars $p\ p'$, which at their rear parts are laterally spread out or provided with lateral extensions $d\ d$, Fig. 5, to receive the seat. The latter is connected to one of these parts by a pivot-bolt, $z$, so that it may be swung outward to the rear to enable any person to mount into the vehicle after folding down the central portion, $b$, of the rear wall of the carriage-body. To facilitate this also there is placed a step, $r$, on the inside of the part $b$ in such a position that it may be conveniently situated when the part is folded down. There may be any suitable device for drawing up the part $b$ and shutting it from within the vehicle. The seat S, being folded back to its place, may be fastened by a hook on the bar $p'$ catching into an eyelet in the edge of the seat. The seat may itself be made to fold—that is to say, the back $t$ may be constructed to fold down upon the seat. It may be held in its closed position by a suitable hook-bolt on the rear of the driving-seat. To close in the gaps between the back and sides of the vehicle when the seat is opened and in use, I prefer to employ two triangular plates, $x$, connected, respectively, to the parts $a$ and $c$, so as to slide within the sides of the vehicle. These plates $x$ may be equilateral, and the angular position of the rear wall of the body, when closed and when open, may be equivalently adjusted, so that the upper edges of the triangles $x$ fill out the spaces between the rear and sides.

What I claim as my invention, and desire to secure by Letters Patent, is—

1. The combination, in a carriage, of a movable rear wall in three parts separately hinged to the floor, sliding bars hinged to the outer parts of the said wall, respectively, and a rear seat supported on said bars, substantially as herein described.

2. The combination, with side walls having a downward and rearward slant at their rear end, as set forth, of a movable rear wall hinged to the floor and triangular plates *x*, attached to said rear wall and adapted to close the space between the side walls and the rear wall when the rear wall is swung backwardly, substantially as and for the purpose described.

3. The combination, with the side walls of the body, of a hinged rear wall in three parts, sliding bars connected, respectively, to the outer ones of said parts and by guide slots and bolts with the side walls, and a movable rear seat pivoted in one of said bars and detachably connected to the other of said bars, substantially as set forth.

OTTO GLISMANN.

Witnesses:
F. ENGAL,
A. SCHAPER.